United States Patent [19]

Santilli

[11] 3,845,321
[45] Oct. 29, 1974

[54] ALTERNATOR POWER SOURCE

[76] Inventor: Raymond R. Santilli, P.O. Box 1032, Oklahoma City, Okla. 73101

[22] Filed: Sept. 13, 1973

[21] Appl. No.: 397,188

Related U.S. Application Data

[63] Continuation-in-part of Ser. No. 235,281, March 16, 1972, Pat. No. 3,761,727.

[52] U.S. Cl. .................................. 290/40, 290/51
[51] Int. Cl. ........................................... H02p 9/04
[58] Field of Search .......................... 290/1, 40, 51

[56] References Cited
UNITED STATES PATENTS

| | | | |
|---|---|---|---|
| 3,513,325 | 5/1970 | Tharp | 290/40 |
| 3,660,671 | 5/1972 | Peterson | 290/40 X |
| 3,668,514 | 6/1972 | Peck | 290/40 X |
| 3,761,727 | 9/1973 | Santilli | 290/40 |

*Primary Examiner*—Robert K. Schaefer
*Assistant Examiner*—W. E. Duncanson, Jr.

[57] ABSTRACT

A power tool operating current is obtained from the alternator of a vehicle engine. A circuit is connected with the vehicle alternator to battery wiring and includes a solenoid operating a vacuum actuated diaphragm for increasing the engine speed and including a relay disconnecting the battery from the circuit when the relay is energized in response to closing the starting switch of a power tool connected with the circuit.

6 Claims, 1 Drawing Figure

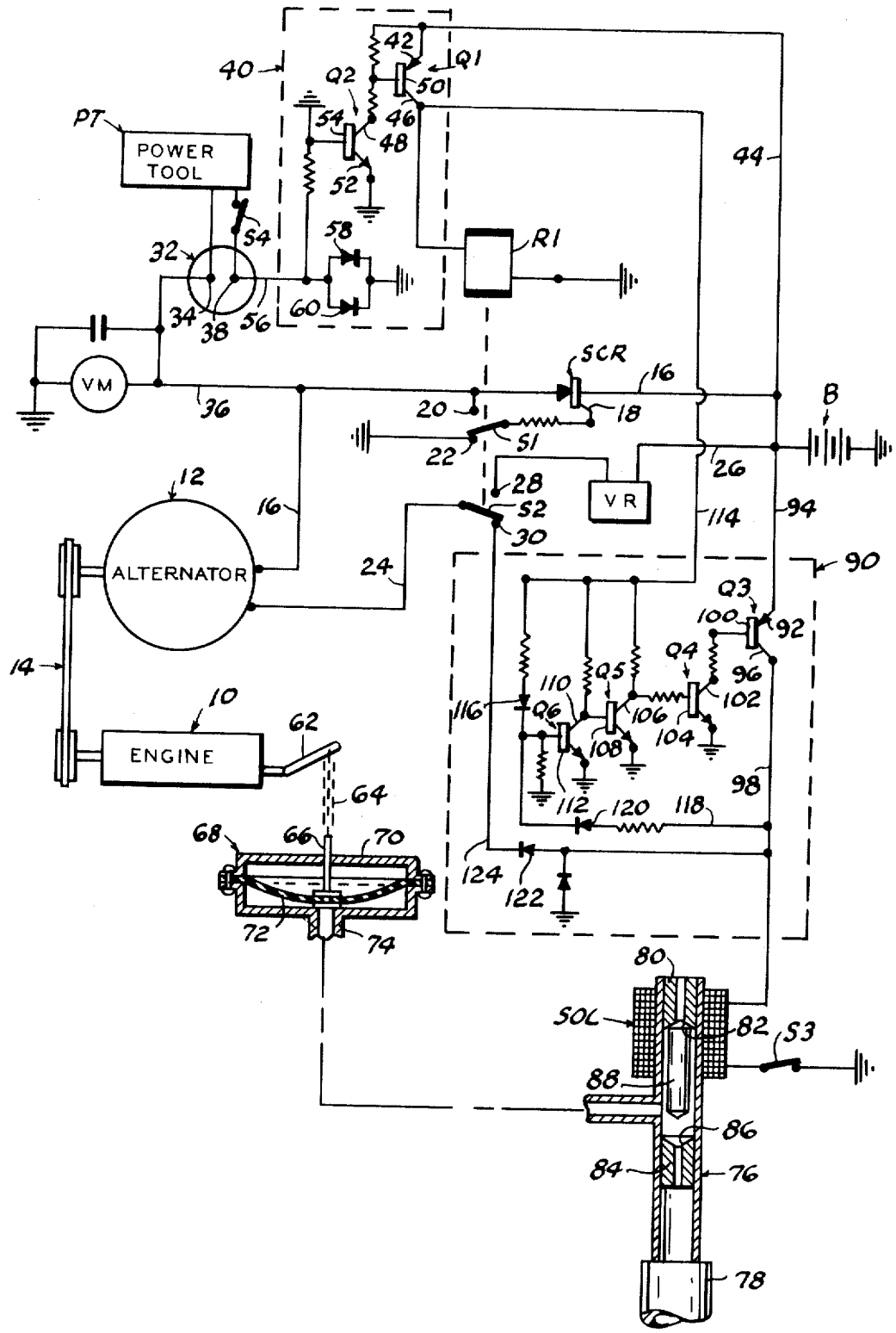

3,845,321

ALTERNATOR POWER SOURCE

CROSS REFERENCE TO RELATED APPLICATION

This application is a continuation-in-part of a U.S. application Ser. No. 235,281, filed Mar. 16, 1972 now U.S. Pat. No. 3,761,727 for ALTERNATOR POWER SOURCE.

BACKGROUND OF THE INVENTION

1. Field of the Invention

The present invention relates to the use of a motor vehicle electrical system to provide a power source for a remote electrical load. More particularly the power output accessory unit of this invention, operated in conjunction with the conventional electrical system of a combustion engine powered vehicle appropriately controlled as to voltage and current output by regulation of the speed of the engine of the vehicle, functions to provide a DC power output at a voltage adequate for operation of a power tool and at a current within the design power rating of the engine driven dynamo of the vehicle.

It is frequently desirable in outdoor service or repair work to use electric power driven hand tools where no source of electricity is readily available. Service and repair work is frequently done by personnel having a pickup truck, or the like, but service trucks are not ordinarily provided with electric generators capable of powering electric hand tools. Most vehicle engines are now equipped with an alternator which is capable of supplying the necessary voltage for operating electric hand tools. A conventional vehicle alternator is three-phase wound having a mechanically driven rotor which produces alternating current rectified by diodes to provide a direct current and maintain the vehicle battery substantially fully charged. However, to utilize an alternator for producing sufficient voltage for operating electric hand tools it is necessary that the wiring from the alternator to the battery of the vehicle be interrupted or disconnected to prevent damage to the battery and other components. I accomplish this by interposing a magnetic switch in the alternator to the battery wiring which is opened by a relay energized by closing a power tool switch prior to an increase of the engine speed.

2. Description of the Prior Art

The most pertinent prior patent is U.S. Pat. No. 3,553,473 which discloses a combustion engine driven power source for a remote power unit and features a vacuum diaphragm operated battery disconnect switch.

This invention is distinctive over this patent by replacing the diaphragm operated battery disconnect switch with a magnetic switch operated prior to increase of voltage thus substantially eliminating arcing and "burning" of battery connect and disconnect contacts. Additionally a safety switch is provided to prevent starting the vehicle engine when the gear train thereof is engaged. This invention is distinctive over the copending application by the inclusion of solid state type current sensing and electronic switching means in place of relays.

SUMMARY OF THE INVENTION

A relay is interposed in the alternator to the battery wiring. A vacuum operated diaphragm, connected with the egine accelerator linkage, is operated by a solenoid controlled valve. A power tool connector plug forms part of a circuit from the alternator to the relay for energizing the relay in response to the closing of a power tool switch connected with a current sensing device so that the relay, when energized, interrupts current from the alternator to the battery. An electronic switching means then connects the battery to the solenoid vacuum valve for advancing the engine accelerator. A safety switch, interposed in the solenoid to ground connection, prevents starting the vehicle engine under unsafe conditions.

The principle objects of this invention are to provide an auxiliary electromechanical power source kit which utilizes a vehicle alternator as an electrical power source connected with a relay through a current sensing device and to a vehicle engine controlling solenoid by an electronic switching means and a safety switch, to insure operation under safe conditions and apply current to the field winding of the alternator while eliminating arcing and burning of contacts normally connecting the alternator to the vehicle battery.

BRIEF DESCRIPTION OF THE DRAWING

The single FIGURE is a schematic of the alternator power source in operative position.

DESCRIPTION OF THE PREFERRED EMBODIMENT

Like characters of reference designate like parts in those figures of the drawings in which they occur.

In the drawings:

The reference numeral 10 indicates a conventional vehicle engine driving an alternator 12 by belt and pulley means 14. The current output terminal of the alternator is connected by a wire 16 to the battery B through a silicon controlled rectifier SCR. The gate 18, of the rectifier SCR, is connected through a limiting resistor to a switch S1, normally closed with its contact 20 connected with the wire 16 between the alternator and the rectifier SCR. The other terminal 22 of the switch S1 is grounded. The switch S1 forms a part of a relay R1 having one end of its coil grounded. The field winding terminal of the alternator is connected to the battery B through a voltage regulator VR by wires 24 and 26. A second relay switch S2, having contacts 28 and 30, is interposed in the wire 24 with the switch normally closed with its contact 28. During normal operation of the vehicle engine, the rectifier SCR is maintained conductive by current from the alternator applied to its gate 18.

A conventional electrical power output socket or receptacle 32 has one of its terminals 34 connected with the wire 16 by a wire 36. A voltage meter VM, connected with the wire 36, is, in turn, connected to ground. The other output terminal 38 of the electrical receptacle is connected to a current sensing device 40 in turn connecting the relay R1 to the battery for energizing the relay in response to current between the receptacle terminals 34 and 38.

The current sensing device 40 comprises primary or first transistors Q1 and Q2 with the transistor Q1 having its emitter 42 connected by a wire 44 to the battery wire 16. The collector 46 of transistor Q1 is connected to the other end of the coil of relay R1. Transistor Q2 has its collector 48 connected with the base 50 of transistor Q1. The emitter 52 of transistor Q2 is grounded and its base 54 is connected to the output receptacle terminal 38 by a wire 56. Between the output receptacle terminal 38 and base of transistor Q2 the wire 56 is connected to ground through a pair of rectifiers 58 and 60.

The engine 10 is provided with accelerator linkage 62 connecced by a ball-chain 64 to one end of a shaft 66 forming a part of a vacuum unit 68. The vacuum unit 68 comprises a closed housing 70 containing a diaphragm 72. The vacuum unit communicates with a tube 74 connected with the stem of a tubular T-shaped member 76 with the axis of the other ends of the T-shaped member 76 preferably vertically disposed. The depending end of the T-shape tube is connected with the engine vacuum source, as indicated by the tube 78. The other end portion of the vertically disposed T-shaped tube is open to the atmosphere and is surrounded by the coil of a solenoid SOL. The open end of the T-shaped tube is partially closed by a centrally drilled plug-like member 80 having a downwardly facing seat 82. The vacuum connected end portion of the T-shaped tube similarly contains a centrally drilled plug-like member 84 having a similar upwardly facing seat 86. The bottom seat 86 is normally closed by a gravity actuated plunger 88 having opposing tapered end surfaces cooperatively seating and sealing with the seats 82 and 86. The solenoid SOL, when energized, lifts the plunger 88 off its seat 86 to advance the accelerator 62 in the manner presently explained.

One end of the coil of the solenoid SOL is connected to ground through a safety switch S3, such as the transmission switch of the vehicle when provided with an automatic transmission. The purpose of the safety switch S3 is to prevent energizing the solenoid and a resultant increase of engine speed when the vehicle transmission is in gear.

An electromagnetic switch device 90 connects the other end of the coil of the solenoid with the battery B. The electromagnetic switching device 90 comprises second transistors Q3, Q4, Q5 and Q6. The emitter 92 of transistor Q3 is connected to the battery B by a wire 94. The collector 96 of transistor Q3 is connected to the other end of the solenoid coil by a wire 98. The base 100 of transistor Q3 is connected to the collector 102 of transistor Q4. The base 104 of transistor Q4 is connected to the collector 106 of transistor Q5 and the base 108 of transistor Q5 is similarly connected to the collector 110 of transistor Q6. The emitters of transistors Q4, Q5 and Q6 are grounded. The base 112 of transistor Q6 is connected to the collector 46 of transistor Q1 by a wire 114 through a resistance and rectifier 116. The collectors of transistors Q5 and Q6 are respectively connected through resistors to the wire 114. The base of transistor Q6 is also connected to the wire 98 through a resistor and rectifier 120 by a wire 118. The wire 98 is also connected through a rectifier 122 to the contact 30 of switch S2 by a wire 124. When it is desired to utilize the current output potential of the alternator a power tool PT is connected with the receptacle 32. The power tool includes a normally open operating switch S4.

OPERATION

In normal operation engine vacuum applied to the tube 78 is normally closed by the plunger 88 seating on its seat 86 and the alternator 12 supplies recharging current to the battery B through the rectifier SCR maintained conductive by the switch S1 closed with its contact 20. The voltage regulator VR supplies field current to the alternator by wires 24 and 26 with the switch S2 closed with its contact 28.

When the power tool PT is connected to the receptacle 32 and the power tool switch S4 is closed, current from the alternator over wires 16 and 36 and through the power tool is applied to the receptacle connected wire 56 so that the current sensing device 40 is activated to apply current from the battery to the coil of relay R1 and energize the relay. This is accomplished by the current from wire 56 being applied to the base 54 of transistor Q2 to render it conductive while its collector 48 applies current to the base 50 of trasistor Q1 to render it conductive. When relay R1 is energized it closes switch S1 with its grounded contact 22 and its switch S2 with contact 30 thus rendering the rectifier SCR nonconductive and interrupting current to the battery. Rendering transistor Q1 conductive, simultaneously, energizes the electromagnetic switching device 90 to energize the coil of solenoid SOL. This is accomplished by current over the wire 114 being applied to the base of transistor Q6 so that its collector 110 applies current to the base of transistor Q5 with its collector and the collector of Q4 in turn applying current to the base 100 of transistor Q3 so that transistor Q3 is conductive and the coil of solenoid SOL is energized, if the safety switch S3 is closed. If the safety switch S3 is open, the coil of solenoid SOL will not be energized. Simultaneously current in the solenoid energizing wire 98 is applied to the field winding of the alternator 12 through the switch S2 closed with its contact 30. When the solenoid SOL is energized it lifts the plunger 88, by magnetic attraction, off its seat 86 to seat on the upper seat 82 thus applying engine vacuum to the diaphragm 72 and advancing the accelerator 62 to a predetermined setting so that this increase of engine speed provides the desired electrical potential for operating the power tool PT. Whenever the power tool switch S4 is released or opened the current sensing device 40 becomes inoperative de-energizing relay R1 and returning the switches S1 and S2 to normal engine operating conditions.

Obviously the invention is susceptible to changes or alternations without defeating its practicability, therefore, I do not wish to be confined to the preferred embodiment shown in the drawings and described herein.

I claim:

1. A vehicle operated power source in combination with
an accelerator equipped internal combustion engine driving an alternator and having its power output and field winding connected with the vehicle battery by wiring, the improvement comprising:
a gate controlled rectifier connected in series in the alternator to battery wiring;
a relay having a coil and having one end of its coil grounded,
   said relay having a magnetic switch normally connecting the alternator output potential to the gate of said controlled rectifier to render the latter conductive;
a normally open circuit connected in series with said alternator power output, said circuit including a pair of power output terminals, one said power output terminal being connected with said alternator power output;

current sensing means connected with the other power output terminal and connecting the other end of the coil of said relay with said battery for energizing said relay when said normally open circuit is closed;

a solenoid having one end of its coil grounded;

electronic switch means connecting the other end of the coil of said solenoid with said battery and said current sensing means, said solenoid being energized when said normally open circuit is closed and being operatively connected with said accelerator for moving said accelerator in an engine accelerating direction; and, means bridging said power output terminals for energizing said relay and said solenoid.

2. The combination according to claim 1 in which the bridging means includes an electrical power operated tool having a closeable electrical circuit connected in series with said pair of power output terminals.

3. The combination according to claim 2 and further including:

a safety switch connected in series between said one end of the coil of said solenoid and ground.

4. The combination according to claim 3 in which said vehicle is provided with an automatic transmission and an engine starting and operating electrical circuit, said safety switch forming a part of said engine starting and operating circuit.

5. The combination according to claim 4 in which said current sensing means includes:

at least one primary transistor having its emitter connected with said battery and having its collector connected with said other end of said relay coil, said other power output terminal being connected with the base of said transistor.

6. The combination according to claim 5 in which said electronic switch means includes:

at least one secondary transistor having its emitter connected with said battery and having its collector connected with said other end of said solenoid coil, the collector of said primary transistor being connected with the base of said secondary transistor.

* * * * *